US008073553B2

(12) United States Patent
Lagarde et al.

(10) Patent No.: US 8,073,553 B2
(45) Date of Patent: Dec. 6, 2011

(54) METHOD FOR CONFIGURING A ROLLER SHUTTER AUTOMATIC CONTROL DEVICE AND ROLLER SHUTTER AUTOMATIC CONTROL DEVICE

(75) Inventors: Eric Lagarde, Sallanches (FR); Olivier Poulet, Fillinges (FR)

(73) Assignee: Somfy SAS, Cluses (FR)

( * ) Notice: Subject to any disclaimer, the term of this patent is extended or adjusted under 35 U.S.C. 154(b) by 328 days.

(21) Appl. No.: 12/278,029

(22) PCT Filed: Feb. 6, 2007

(86) PCT No.: PCT/IB2007/000275

§ 371 (c)(1), (2), (4) Date: Aug. 1, 2008

(87) PCT Pub. No.: WO2007/091143

PCT Pub. Date: Aug. 16, 2007

(65) Prior Publication Data

US 2009/0018674 A1 Jan. 15, 2009

(30) Foreign Application Priority Data

Feb. 6, 2006 (FR) ..................................... 06 01055

(51) Int. Cl.
*G05B 11/01* (2006.01)

(52) U.S. Cl. ......................................... 700/16; 700/275

(58) Field of Classification Search .................... 700/14, 700/16, 275, 276, 295, 17, 83, 296; 315/149, 315/159

See application file for complete search history.

(56) References Cited

U.S. PATENT DOCUMENTS

| | | | | |
|---|---|---|---|---|
| 4,922,407 | A | 5/1990 | Birk et al. | |
| 5,086,314 | A * | 2/1992 | Aoki et al. | 396/61 |
| 5,808,294 | A * | 9/1998 | Neumann | 315/159 |
| 5,818,734 | A * | 10/1998 | Albright | 700/306 |
| 5,898,384 | A * | 4/1999 | Alt et al. | 340/825.36 |
| 5,936,362 | A * | 8/1999 | Alt et al. | 315/312 |
| 6,473,661 | B1 * | 10/2002 | Wollner | 700/83 |
| RE38,036 | E * | 3/2003 | Neumann | 315/159 |
| 6,658,303 | B2 * | 12/2003 | Hatemata et al. | 700/14 |
| 7,417,397 | B2 * | 8/2008 | Berman et al. | 318/468 |
| 2005/0040247 | A1 * | 2/2005 | Pouchak | 236/44 C |

FOREIGN PATENT DOCUMENTS

| | | | |
|---|---|---|---|
| CA | 2 300 465 | A | 9/2001 |
| CA | 2300465 | A | 9/2001 |
| DE | 30 19 279 | A | 11/1981 |
| EP | 0 447 849 | A | 9/1991 |
| GB | 2 305 264 | A | 4/1997 |
| GB | 2305264 | A | 4/1997 |
| JP | 61-17090 | | 1/1986 |

* cited by examiner

*Primary Examiner* — Charles Kasenge
(74) *Attorney, Agent, or Firm* — Frommer Lawrence & Haug LLP; Ronald R. Santucci

(57) ABSTRACT

The method allows the configuration of a blind control device being capable of sending at least one automatic control command at a time changing in the course of a year in a periodic manner, the period being equal to the calendar year. It is wherein it comprises a first step comprising the input of a first time at which the automatic control command must be emitted on a first given day of the year and the input of a second time at which the automatic control command must be emitted on a second given day of the year, and an automatic step of calculating each time at which the automatic control command must be emitted on any other day of the year.

10 Claims, 3 Drawing Sheets

METHOD FOR CONFIGURING A ROLLER SHUTTER AUTOMATIC CONTROL DEVICE AND ROLLER SHUTTER AUTOMATIC CONTROL DEVICE

This application is a 371 of PCT/I2007/000275 filed on Feb. 6, 2007, published on Aug. 16, 2007 under publication number WO 2007/091143 A which claims priority benefits from French Patent Application Number 06 01055 filed Feb. 6, 2006, the disclosure of which is incorporated herein by reference.

BACKGROUND OF THE INVENTION AND DESCRIPTION OF THE PRIOR ART

The invention relates to a method for configuring a control device of a home-automation appliance, the control device being capable of sending at least one first automatic control command at a time changing in the course of a calendar year in a periodic manner, the period being equal to the calendar year. The invention also relates to a control device for a home-automation appliance, being capable of sending at least one first automatic control command at a time changing in the course of a calendar year.

Document EP 0 447 849 discloses a motorized blind or shutter control device in which control timetable for the blind or shutter are stored in table form. For each day of the year, a first time for opening the shutter or unfurling the blind and a second time for closing the shutter or folding back the blind are stored in a memory. One and the same first time and one and the same second time is assigned to several consecutive days.

As an alternative to storage in table form, the control times can be determined by calculation according to a mathematical function input into memory. Specifically, if its timetable is fixed by the sunrise and sunset times, the latter vary in the course of the year, according to laws which can be approximated by functions of cosine type. These laws of variation depend on geographical location, in particular longitude and latitude.

In application EP 0 447 849, the stored control timetable or the function making it possible to calculate it are based on a reference geographical location, in this instance the town of Frankfurt.

Provision is made that, as a function of the geographical location where the control device is installed, the user or the installer can input certain information (relating to latitude and longitude) so as to automatically recalculate the opening and closing times.

Also, document U.S. Pat. No. 4,922,407 discloses a timetable programming device for controlling equipment. It comprises in particular an astronomical clock for emitting, for example, commands at sunrise times.

Also, document CA 2,300,465 discloses a timetable programming device for controlling home-automation equipment. The device also comprises an astronomical clock, the inputting of a latitude parameter being necessary for its operation.

Also, document DE 30 19 279 describes an automatic timetable control device for roller shutters, for which the installer or the user can manually input an offset with respect to the opening and closing control time based on the sunrise or sunset times. Thus, an offset of a quarter of an hour before sunrise can be input as set value.

The control devices of this type are linked to a clock or comprise a clock. During their operation, the current time, given by the clock, is compared with the opening and closing control times. These control times include optional time-offset instructions with respect to the sunrise and sunset times, the time-offset instructions being configured by the installer or the user. When the current time corresponds to a control time, the command associated with this control time is transmitted to the roller shutter for execution.

The blind opening control times correspond substantially to the sunrise times and the blind closing control times substantially correspond to the sunset times.

Document EP 0 447 849 seeks to simplify with respect to the state of the art the storing of the control timetable in memory, in particular by applying the same control times on several consecutive days.

On the other hand, the procedures allowing the modification of the reference timetable to obtain the desired control times remain complex or fairly rigid. In the case of document EP 0 447 849, the installer or the user must as seen previously input latitude and longitude data which are not necessarily always obvious to find. In the case of document DE 30 19 279 also, the time-offset instruction is applied on every day of the year without distinction.

Moreover, these devices hardly make it possible, if at all, to take into account the characteristics of the environment of the building where they are installed, such as the geographical characteristic (presence of mountains or buildings which block out the sunlight during part of the day) or the characteristic of use of the building determining the activity of the users.

SUMMARY OF THE INVENTION

The aim of the invention is to propose a method for configuring a control device remedying the aforesaid drawbacks and improving the configuration methods known in the prior art. In particular, the method according to the invention makes it possible to simplify and to render more intuitive the operations of configuring a control device for a moveable element operating on a timetable basis, while allowing heavy customization of this device.

The configuration method according to the invention is wherein it comprises the following steps:

- a first input step comprising the input of a first time at which the first automatic control command must be emitted on a first given day of the calendar year and the input of a second time at which the first automatic control command must be emitted on a second given day of the calendar year,
- an automatic step of calculating each time at which the first automatic control command must be emitted on any other day of the calendar year.

Various modes of execution of the method according to the invention are defined by dependent claims 2 to 9.

The device according to the invention allows the control of a home-automation appliance and is capable of sending at least one first automatic control command at a time changing in the course of a calendar year. It is wherein it comprises hardware means and software for implementing the previously defined configuration method.

BRIEF DESCRIPTION OF THE DRAWINGS

The appended drawing represents, by way of example, an embodiment of a control device according to the invention and modes of execution of a configuration method according to the invention.

DESCRIPTION OF THE PREFERRED EMBODIMENTS

Figure 1:
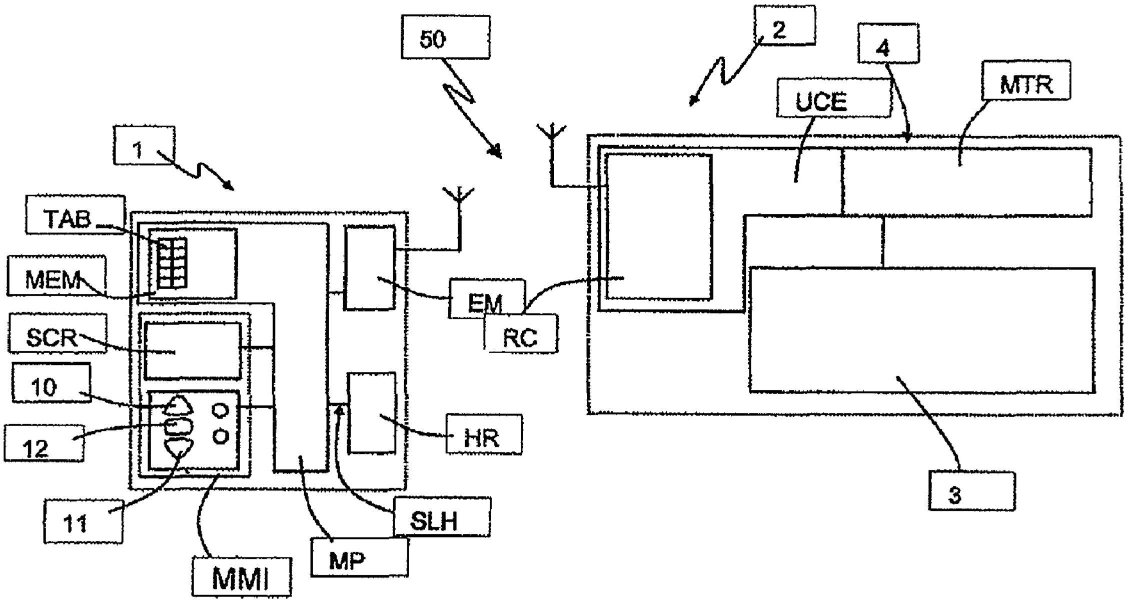
FIG. 1 is a diagram of an embodiment of a control device according to the invention.

A home-automation installation 50 is described hereinafter with reference to FIG. 1.

The installation comprises a control device 1 and a motorized home-automation appliance 2, the control device controlling the motorized home-automation appliance.

The motorized home-automation appliance 2 comprises a roller shutter 3 and an actuator 4. The actuator 4 is in a known manner an actuator of tubular type comprising motor reduction gear MTR and a control unit UCE, both mounted inside a tubular casing. The actuator 4 is itself disposed in a winding tube around which the roller shutter 3 will be wound.

The control unit UCE optionally comprises a receiver RC of electromagnetic waves receiving control commands. The control unit UCE receives electromagnetic signals by way of the receiver RC and interprets them so as to drive the actuator 4, and therefore control the roller shutter. The control unit UCE also comprises a device for managing the position of the roller shutter 3.

The control device 1 comprises a man-machine interface MMI comprising in particular a set of input keys 10, 11, 12 and an information screen SCR. This man-machine interface is linked to a microprocessor MP comprising a memory MEM.

The control device also comprises a clock HR, whose signals SLH are analyzed at the microprocessor MP level. The signals SLH contain date information comprising in particular indications making it possible to identify the current day among all the days of the year and the current time. The time is determined at least to within a few minutes, for example at least to within five minutes.

The microprocessor MP is also linked to an emitter EM of electromagnetic waves, so as to emit control commands destined for the receiver RC of the control unit UCE of the motorized home-automation appliance 2. The memory MEM contains a table TAB, whose initial content comprises, by default, a control timetable. This timetable corresponds to the times of the sunrises and sunsets for each day of the year in a given town, for example Stuttgart. Commands for opening the roller shutter are associated with the sunrise times and commands for closing the roller shutter are associated with the sunset times. These values allow the installation 50 to operate even in the absence of configuration that is customized during installation.

The table TAB is divided into a first table T1, able to contain the daily time for opening the roller shutter for each day of the calendar year, and a second table T2, able to contain the daily time for closing the roller shutter for each day of the calendar year.

The microprocessor MP compares the data arising from the signals SLH of the clock with the data of the table TAB. As soon as the current date corresponds to one of these times, the microprocessor establishes a control command, in particular as a function of the table T1 or T2 from which the value corresponds with the current date. This control command is thereafter emitted and then executed, and this results in an opening or closing movement of the roller shutter.

Alternatively, the table TAB contains not times, but numerical values from which a time can be calculated. For example, a value equal to the time expressed in minutes or in units equal to five minutes.

Alternatively, the daily table is replaced with a mathematical function, for example a smoothing function, fixed by a few stored numerical values. The memory MEM then contains at least two locations intended for recording two values for each of the types of control commands.

Input keys 10, 11, 12 of the man-machine interface MMI are used in particular to manually control the motorized home-automation appliance. They also serve for adjusting the current date (day and time), the up key 10 being used to increment this value, the down key 11 to decrement the latter and the STOP key 12 to confirm an adjustment.

According to the invention, these input keys can also be used to input the minimum and maximum adjustment values necessary for adapting the values of the table TAB in memory.

The configuration method according to the invention allows an installer or a user to configure the installation in a very simple manner.

As seen previously, the movements of the roller shutter are performed automatically over a calendar year. The opening and closing times are dependent on a timetable defined by an interaction between a theoretical temporal function defining sunrise or sunset times and data input by the user.

It being possible for the installation to be used in very diverse places, the data of the initial configuration do not in general correspond to the geographical situation and also do not necessarily correspond to the wishes of the user.

To adapt the theoretical functions stored in memories or the discrete values (control times) stored in memory to the situation of the building equipped with the home-automation installation, it is required to input data. On the basis of these data, the control device redefines the theoretical functions or the discrete values stored in memory.

The data input can define a seasonal amplitude of variation of the closing times or opening times for the roller shutter.

The control times determined can be the official sunrise and sunset times. If the maximum sunset time and the minimum sunset time for a given place are input as data, the control times for closing the roller shutter correspond to the sunset times for this place. Specifically, the calculation of the control timetable is based on input times, and these times make it possible to determine a non-linear function, whose representative curve preferably comprises a point of inflection between its various extrema. Preferably, this function is a mathematical function of sinusoid portion type.

On the basis of the control timetable thus determined, it is possible to control opening and closing movements of the roller shutter.

The calculation of the control timetable for closing the roller shutter is taken as an example. (This example applies in the same manner to the calculation of the timetable for opening the roller shutter.)

It is assumed that the control times to be input are the control times for closing the roller shutter at the winter and summer solstices. The user is free to choose, for these two dates, the times that he wishes to input. The times input can be the official sunset times for the location where the home-automation appliance is installed. The times input can also be experimental values of the sunset times, that the user observes. Finally, these data can be totally independent of the sunset times. For example, assume that the user wishes the roller shutter to close at about 21 h30 at the latest in summer and around 17 h00 at the latest in winter, without reference to sunset where he is. He need merely input these two times when configuring the control device.

With these input times, the control device is able to interpolate, for every day lying between the solstices, the control times for automatically closing the roller shutter. Accordingly, it uses a non-linear mathematical function. This function does not necessarily correspond to the mathematical function determining the sunset times at the location where the home-automation appliance is installed, but it corresponds as closely as possible to the user's expectations.

Specifically, the closing times will be incremented progressively in the course of the year, from the minimum value chosen for the winter solstice to the maximum value chosen for the summer solstice, and then decremented, so as to again reach the minimum value at the winter solstice. Insofar as these variations follow substantially those of the mathematical function defining the times for sunsets at the location where the home-automation appliance is installed, the offsets in automatic closing control times between two successive days are quite natural and correspond to the user's rhythm of life.

Configuration of the control device, for closing control, therefore requires the input of two items of data only.

In the case where the times input correspond at least approximately to the sunset times at the solstices, the control device can also calculate, at least approximately, the sunrise times at the location where the home-automation appliance is installed. Specifically, these can be deduced from the latitude of the location where the home-automation appliance is installed, this itself being related to the amplitude of variation of the sunset time over a year.

A significant advantage of the invention relates to the dissociation between the daily variations of the opening and closing control times.

Thus the user, having chosen the times 21 h30 and 17 h30 (annual amplitude of variation: 4 hours) to define the maximum and minimum automatic closing control times, can choose the times 7 h20 and 6 h40 (annual amplitude of variation: 40 minutes) to define the maximum and minimum automatic opening control times.

In the same manner as previously, the variation of the control time for automatically opening the blind in the morning is very gentle and natural, since it follows a trend obtained on the basis of a mathematical function determining the sunrise times.

Devices according to the prior art could not operate in accordance with the previous example, since the times for automatically controlling closing of the blind correspond approximately to sunset times for a town like Lyon, while the times for automatically controlling opening correspond approximately to sunrise times for a town much closer to the equator, for example Dakar.

Beyond the dissociation between the times for automatically controlling opening and closing, the invention affords a great deal of simplification in configuration. The temporal data to be input by the user correspond indeed to commonplace and very meaningful data, corresponding to everyday life, much more so than latitude, longitude or an arbitrary time offset value with respect to a default value.

An additional advantage of the invention is that input is also very simple, since it is possible to use the same functionalities (input keys, ergonomics) as those used for adjusting the clock. Thus, a standard clock screen is perfectly suitable for its implementation.

The adjustment procedure is described with reference to the flowchart of FIG. 2.

In step 100, the user inputs the control device configuration mode. This configuration mode may result in the displaying of adjustment menus on the screen SCR, which include an evening Twilight menu and a morning Twilight menu.

In a step 101, the user selects the evening Twilight menu and finds himself in a first adjustment configuration, for which he can input, in a step 102, a time VFa for closing the roller shutter desired for the summer (summer solstice), and, in step 103, a time VFb for closing the roller shutter desired for the winter (winter solstice).

On exiting each input step, in a step 104, a recording of the times input $VF_a$ and $VF_b$ is performed.

In a step 105, the control timetable for closing the roller shutter for the various days of the calendar year are calculated on the basis of the previously input times.

In a step 106, the part T1 of the table TAB is updated by using the closing control times calculated during step 105.

In a step 111, the user selects the morning Twilight menu and finds himself in a second adjustment configuration, for which he can input, in a step 112, a time $VO_c$ for opening the roller shutter desired for the summer (summer solstice), and, in step 113, a time $VO_d$ for opening the roller shutter desired for the winter (winter solstice).

On exiting each input step, in a step 114, a recording of the times input $VO_c$ and $VO_d$ is performed.

In a step 115, the control timetable for opening the roller shutter for the various days of the calendar year are calculated on the basis of the previously input times.

In a step 116, the part T2 of the table TAB is updated by using the opening control times calculated during step 115.

The various steps 101, 102, 103, 111, 112 and 113 can be carried out in any order; the user can also repeat the adjustments if they do not seem to him to be suitable.

Exit from the configuration mode is performed in a step 120.

Figure 2:
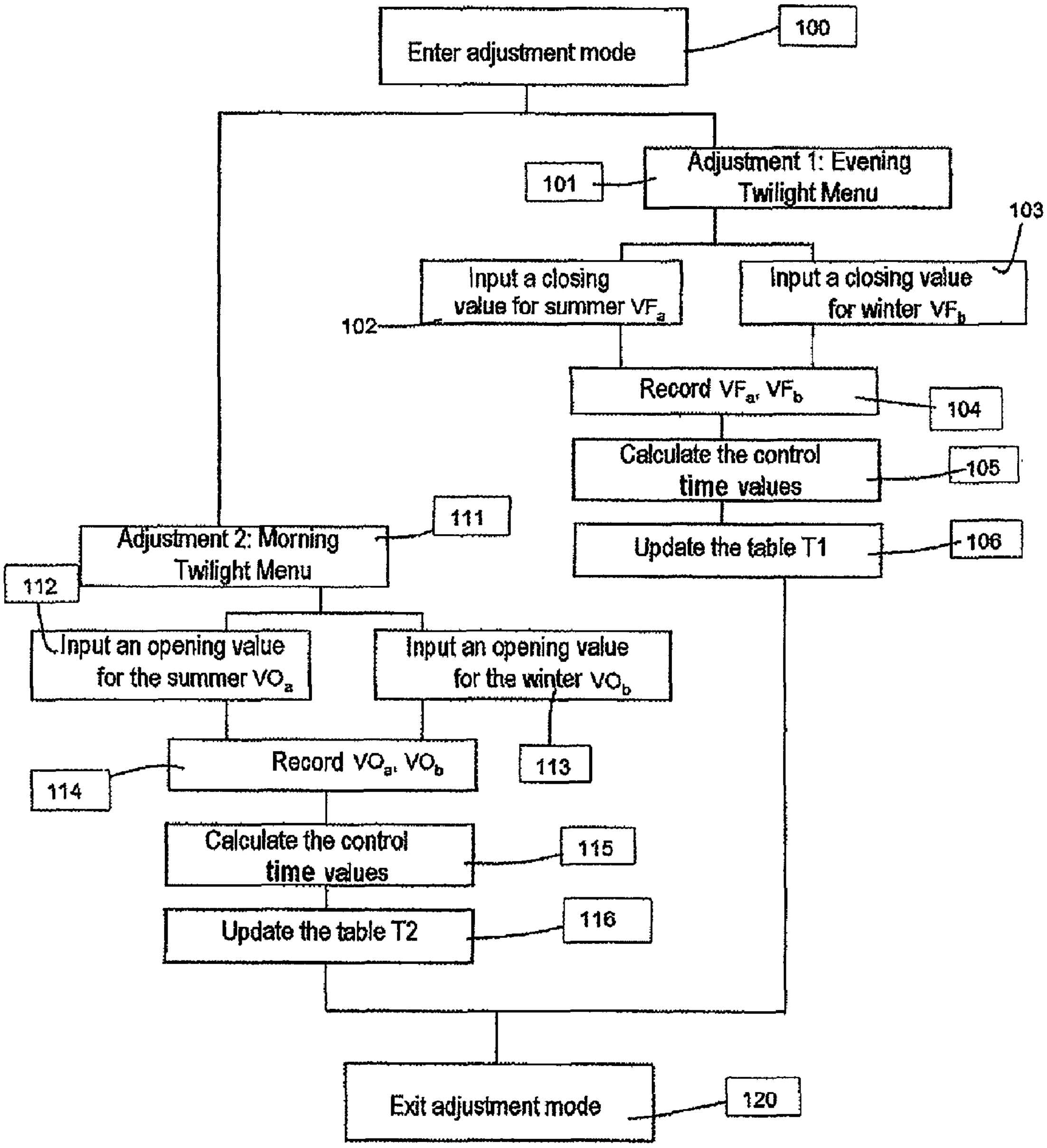
FIG. 2 is a flowchart of a mode of execution of the configuration method according to the invention.

As represented in FIG. 2, it is possible to exit the configuration mode after having performed solely the first adjustment or after having performed solely the second adjustment. In this case, no automatic action will take place for the twilight which has not been adjusted. Alternatively, the unadjusted twilight will give rise to automatic maneuvers with timetable or times predefined by default.

A variant of the embodiment described in FIG. 2 consists in arranging the branches containing steps 101-106 and 111-116 not in parallel but in series. Thus, exit from the configuration mode can take place only after execution of both adjustments.

Exit from the configuration mode can also precede the steps of calculating the control times 105, 115 and the steps of updating the table or tables 106, 116.

Specifically, the steps of calculating the control timetable for the roller shutter for a given day can be carried out on this given day. For example, each day, at midnight, the control times for the new day are calculated. In this case, steps of the configuration method are in fact performed in the background of the operating method of the control device whereas the latter is no longer in the configuration mode. In this case, a memory comprising a table for storing the control times for the various days of the calendar year is not necessary. A memory comprising three timetable storage areas for each control command is sufficient. A first and a second area are assigned to the storage of the times input by the user. A third storage area is assigned to the storage of the control time relating to the current day, this time being recalculated each day.

The essential point is that the configuration mode has made it possible to carry out either the entirety of the steps described in FIG. 2, or at least the recording in memory of the times $VO_c$ and $VO_d$ and/or $VF_a$ and $VF_b$.

Input of the control times by the user could be done for dates other than the solstices. In this case, it is necessary that, in addition to control times, the user inputs the dates of the calendar year that are pertinent to these times. The days corresponding to the times $VF_a$, $VF_b$, $VO_c$ and $VO_d$ are denoted $t_a$, $t_b$, $t_c$ and $t_d$.

Input of the control times in steps 102, 103, 112 and 113 can be performed by modifying the time values present in memory. The user then uses the keys 10 and 11 to increment or decrement these values, before recording it. Thus, during the first use, the user can tag which value is input by default. During a subsequent use, the user can tag which was the previous adjustment. Adjustment is facilitated insofar as the new value will generally differ little from the old. A reset to zero menu can be provided so as to reassign, in these memories, default time values or erase these memories.

A first mode of execution for calculating control times is described hereinafter. This corresponds to what is carried out in steps 105 and/or 115.

For the closing control commands, in this first mode of execution, the control device will calculate coefficients A, B and C of a function:

$$VF(t) = A + B \times \sin\left(\frac{2 \times \pi \times t}{365} + C\right)$$

making it possible to associate a closing control time with each day of the year, identified by an index t evolving from 0 to 364.

These coefficients are determined in such a way that $VF(t_a) = VF_a$ and $VF(t_b) = VF_b$.

Likewise, for the opening control commands, in this first mode of execution, the control device will calculate coefficients D, E and F of a function:

$$VO(t) = D + E \times \sin\left(\frac{2 \times \pi \times t}{365} + F\right)$$

making it possible to associate a closing control time with each day of the year, identified by an index t evolving from 0 to 364.

These coefficients are determined in such a way that $VO(t_c) = VO_c$ and $VO(t_d) = VO_d$.

Thus, the functions thus determined possess a point of inflection between their maximum and minimum values. The values of the coefficients C and F are furthermore such that the extrema of the function are situated at the dates of the summer and winter solstices.

Alternatively, the times can be calculated on the basis of a table of reference values. For example, a table is used whose initial content comprises by default control times. These times correspond to the sunrise and sunset times for each day of the year in a given town, for example Stuttgart. Two control times for opening the roller shutter for two different days of the year and two control times for closing the roller shutter for two different days of the year are input thereafter.

On completion of these inputs, the values of the tables are automatically modified so that the opening and closing control times are those input for the days concerned above and so that the control times change in a manner similar to the evolution of the values initially present in the table.

For example, if the closing control times initially present in the table change according to a sinusoidal law between 17 h at the winter solstice and 20 h at the summer solstice and if an installer inputs a new closing time of 18 h at the winter solstice and a new closing time of 19 h at the summer solstice, all the values of the table are modified in such a way that the closing timetable that they define change according to a sinusoidal law between 18 h at the winter solstice and 19 h at the summer solstice.

The dates at which the new time values are input are not necessarily the dates of the solstices, but can correspond to arbitrary days of the year. In particular, the data can for example be input for any two days lying between a summer solstice and the following winter solstice. These data make it possible to define a law of control times between the solstices. The law of control times for the remainder of the year can thereafter be constructed by symmetry.

Other functions can be used. They can optionally exhibit a second point of inflection to take account of obstacles that might, at certain periods of the year, be interposed between the building equipped with the roller shutter and the sun in its travel between its rising and its setting.

The timetables can also be calculated by virtue of a function of a type other than the trigonometric function previously used. For example, the function can be a linear function of annual period and such that the extrema of the function lie at the dates of the summer and winter solstices.

The calculated timetables can optionally be compensated, for example so that they are smoothed over the year.

Figure 3:
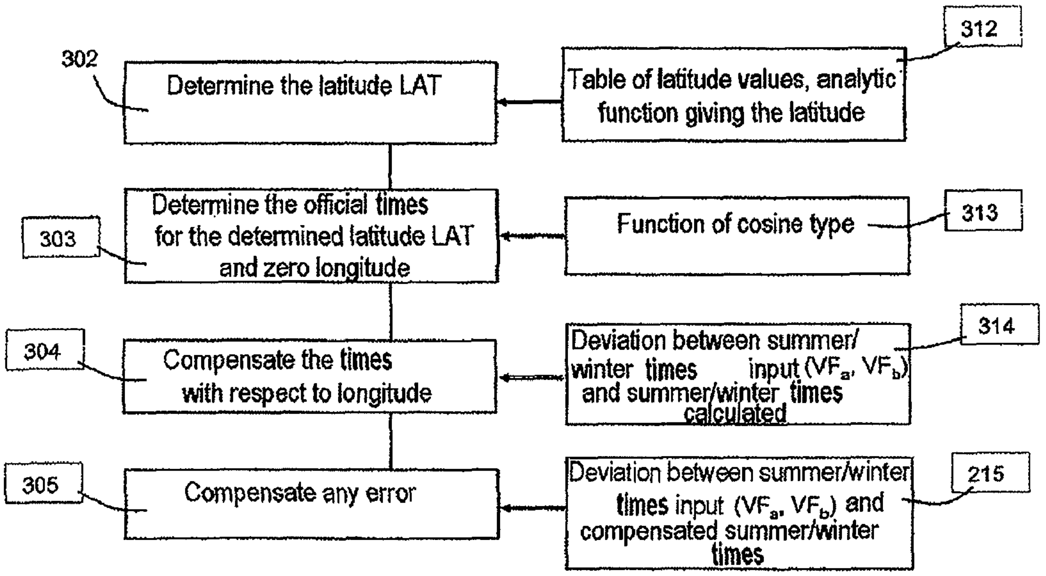
FIG. 3 is a flowchart of a second variant of execution of an automatic step of calculating control times for all the days of a calendar year.

In a second mode of execution for calculating control timetables, described hereinafter with reference to FIG. 3, more precise calculations can be implemented to determine the control times. The calculation of the control timetables then follows a calculation law which comprises several steps, following data input.

These steps are as follows:

- determination of a seasonal amplitude of variation of the sunrise or sunset times,
- automatic determination of a corresponding latitude,
- determination of the official sunrise and sunset times for the determined latitude at zero longitude,
- compensation with respect to longitude,
- error compensation,
- calculation of the control timetables.

It is beneficial to install the calculation algorithm giving maximum accuracy. Thus, if the temporal data input are the true times of sunrise and sunset at the spot where the home-automation appliance is installed, throughout the year, the times for automatically controlling the roller shutter will be the same as the sunrise and sunset times, and this may satisfy a user having a liking for accuracy. Alternatively, this algorithm will give a variable, but consistent, time function in the case where the times that served to establish it were chosen in an arbitrary manner by the user.

In this mode of execution, the assumption is made, even if this is not necessarily the case, that the times input by the user and associated with particular days of the year correspond to the times of sunset or sunrise occurring on these days at the spot where the home-automation appliance is installed.

With the input times, the control device calculates the latitude associated with the geographical place in the course of a step 302. This latitude is determined on the basis of a table of values or a theoretical function placed in memory and giving the latitude as a function of two sunset times on two different dates or as a function of two sunrise times on two different dates. The use of these data is represented by a step 312. Stated otherwise, the latitude is calculated as a function of the seasonal amplitude of the variation of the sunset times or of the sunrise times.

The function for determining the latitude can be constructed in an empirical manner, by interpolation and/or extrapolation between data input for various towns at various latitudes.

In a step 303, the so-called official sunset and sunrise times for a given longitude equal to zero are determined as a function of latitude.

In the same manner as seen previously, the official times are calculated using a function of sine type. This use is represented by a step 313.

In a step 314, the official sunrise or sunset times are compared with the opening or closing control times input for the dates ta, tb or tc, td. The deviation between these values makes it possible to determine, in a step 304, the necessary compensation for taking account of the longitude of the location where the home-automation appliance is installed.

It is not necessary to determine the longitude itself, but this can be done in a manner equivalent to the determination of the latitude. The compensation in terms of longitude is akin to an offset over time of the calculated times. This compensation is determined and applied in a step 304.

An optional error compensation, to readapt the times compensated in step 304 to the times input, can be implemented in step 305. This step uses the deviation between the times input and the compensated times calculated.

The installation operating as described above makes it possible to simulate the presence of the users in the building insofar as the roller shutters neither open nor close at the same time every day. However, to improve this simulation of presence, it is possible to configure a random time offset of a few minutes, added to or subtracted from the control times.

The home-automation installation according to the invention can be used with a sunshine sensor.

The summer/winter hour change adjustment, if selected, can also be taken into account automatically, the times being calculated by taking account of these changes of hour.

In the case of the roller shutter described, as in the case of other home-automation appliances, the automatic control commands whose times change over a calendar year can comprise:

- the closing control commands and the opening control commands,
- the closing control commands alone,
- the opening control commands alone.

The configuration method has been described applied to the configuration of a roller shutter device. It can however be applied to the configuration of any other type of home-automation appliance, in particular to a awning device, to a lighting device or to a device for closing an accessway.

In the device described the automatic control commands are movement commands. However, the automatic control commands can, in particular when they are intended for other types of home-automation appliance, be commands to change operating mode and in particular commands of the "On" and "Off" type.

The invention claimed is:

1. A method for configuring a control device of a home-automation appliance comprising a movable element operating on a timetable basis, the control device being capable of sending at least one first automatic control command at a time changing in the course of a calendar year in a periodic manner, the period being equal to the calendar year, wherein it comprises the following steps:

(i) a first input step comprising:
 (a) a user direct selection of a first day of the calendar year
 (b) a user direct input of a first time at which the first automatic control command must be emitted on the first day;
 (c) a user direct selection of a second day of the calendar year; and
 (d) a user direct input of a second time at which the first automatic control command must be emitted on the second day;
(ii) an automatic step of calculating each time at which the first automatic control command must be emitted on any other day of the calendar year;

wherein the first automatic control command operates the movable element.

2. The configuration method as claimed in claim 1, wherein the first and second days are the summer and winter solstice days.

3. The configuration method as claimed in claim 1, wherein the control device is capable of sending a second automatic control command at a time changing in the course of a year in a periodic manner, the period being equal to the calendar year, and which method comprises:

(i) a second input step comprising:
 (a) a user direct selection of a third day of the calendar year;
 (b) a direct user input of a third time at which the second automatic control command must be emitted on the third day;
 (c) a user direct selection of a fourth day of the calendar year; and
 (d) a direct user input of a fourth time at which the second automatic control command must be emitted on the fourth day;
(ii) an automatic step of calculating each time at which the second automatic control command must be emitted on any other day of the calendar year.

4. The configuration method as claimed in claim 3, wherein the third and fourth days are the summer and winter solstice days.

5. The configuration method as claimed in claim 1, wherein the times input correspond to the sunrise and sunset times at the location where the home-automation appliance is installed.

6. The configuration method as claimed in claim 1, wherein the automatic calculation step comprises the use of a non-linear mathematical function of period equal to a calendar year.

7. The configuration method as claimed in claim 1, wherein the automatic calculation step comprises the use of a mathematical function exhibiting at least one point of inflection between its various extrema.

8. The configuration method as claimed in claim 7, wherein the extrema of the function used in the automatic calculation step correspond to the times input in the input step.

9. The configuration method as claimed in claim 1, wherein the change between the summer hours and the winter hours is taken into account.

10. A control device for a home-automation appliance, being capable of sending at least one first automatic control command at a time changing in the course of a calendar year, which device comprises hardware means and software for implementing the configuration method as claimed in claim 1.

* * * * *